(12) United States Patent
Nagahara

(10) Patent No.: US 11,556,290 B2
(45) Date of Patent: Jan. 17, 2023

(54) INFORMATION PROCESSING APPARATUS, CONTROL METHOD THEREFOR AND STORAGE MEDIUM

(71) Applicant: CANON KABUSHIKI KAISHA, Tokyo (JP)

(72) Inventor: Ryuji Nagahara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/336,488

(22) Filed: Jun. 2, 2021

(65) Prior Publication Data

US 2021/0286570 A1    Sep. 16, 2021

Related U.S. Application Data

(63) Continuation of application No. 16/592,127, filed on Oct. 3, 2019, now Pat. No. 11,055,039.

(30) Foreign Application Priority Data

Oct. 4, 2018 (JP) .............................. JP2018-189139

(51) Int. Cl.
  *G06F 3/12* (2006.01)
  *H04N 1/32* (2006.01)

(52) U.S. Cl.
  CPC .......... *G06F 3/1236* (2013.01); *G06F 3/1209* (2013.01); *H04N 1/32539* (2013.01)

(58) Field of Classification Search
  CPC .. G06F 3/1236; G06F 3/1209; H04N 1/32539
  USPC .................................................. 358/1.15, 1.9
  See application file for complete search history.

(56) References Cited

U.S. PATENT DOCUMENTS

| 2002/0144024 | A1  | 10/2002 | Kumpf et al. |
| 2007/0260786 | A1* | 11/2007 | Fukunaga ............. G06F 13/385 |
| | | | 710/62 |
| 2010/0235655 | A1  | 9/2010  | Tauscher et al. |
| 2016/0224281 | A1* | 8/2016  | Yue ..................... H04L 41/0672 |

(Continued)

FOREIGN PATENT DOCUMENTS

| JP | 2006185218 A | 7/2006 |
| JP | 2009240384 A | 10/2009 |

(Continued)

OTHER PUBLICATIONS

Japanese Office Action dated Sep. 29, 2020, for Corresponding Japanese Application No. 2018-189139.

(Continued)

*Primary Examiner* — Quang N Vo
(74) *Attorney, Agent, or Firm* — Carter, DeLuca & Farrell LLP

(57) ABSTRACT

Convenience and security of an information processing apparatus including a USB host interface in a case where network connection is established via a USB-LAN adapter are improved. The information processing apparatus includes a plurality of external USB ports to which USB compatible network adapters are connected. The information processing apparatus performs a predetermined notification in response to a number of the network adapters connected to the information processing apparatus via the external USB ports having reached a predetermined upper limit.

13 Claims, 12 Drawing Sheets

(56) References Cited

U.S. PATENT DOCUMENTS

2017/0054860 A1* 2/2017 Sakuma ............. H04N 1/00204
2019/0354329 A1 11/2019 Amarendra et al.

FOREIGN PATENT DOCUMENTS

| | | |
|---|---|---|
| JP | 2010049333 A | 3/2010 |
| JP | 2010191717 A | 9/2010 |
| JP | 2017209837 A | 11/2017 |

OTHER PUBLICATIONS

Fuji Xerox Co., Ltd., ApeosPort-VI C7771 / C6671 / C5571 / C4471 / C3371 / C2271 DocuCentre-VI C7771 / C6671 /C5571 / C4471 / C3371 / C2271 Administrator's Guide, Oct. 2017, 1st Edition, 4 pages, (referenced in English translation of Decision of Refusal).
Decision of Refusal issued by the Japan Patent Office dated May 11, 2021 in corresponding JP Patent Application No. 2018-189139, with English translation.

* cited by examiner

INFORMATION PROCESSING APPARATUS, CONTROL METHOD THEREFOR AND STORAGE MEDIUM

CROSS REFERENCE TO RELATED APPLICATIONS

This application is a continuation of U.S. patent application Ser. No. 16/592,127, filed on Oct. 3, 2019, which claims the benefit of and priority to Japanese Patent Application No. 2018-189139, filed on Oct. 4, 2018, each of which is hereby incorporated by reference herein in their entirety.

BACKGROUND OF THE INVENTION

Field of the Invention

The present invention relates to controlling of a network interface via a USB-connected LAN adapter.

Description of the Related Art

In recent years, with the security required for networks and the complexity of functionality, configurations which allow selective use of a plurality of LANs (Local Area Networks) in offices, commercial facilities and the like have generally been used. For an information processing apparatus used in such a network environment, it is demanded that a single information processing apparatus can support a plurality of LANs. One method for supporting a plurality of LANs with a single information processing apparatus is usage of a NIC (Network Interface Card) having a USB (Universal Serial Bus) interface. Hereinafter, a NIC having a USB interface will be referred to as a "USB-LAN adapter."

It is possible to connect as many USB-LAN adapters as the number of USB host interfaces installed in an information processing apparatus. However, in an information processing apparatus such as an MFP, the number (the upper limit) of USB-LAN adapters that can be used simultaneously may be restricted from the viewpoint of preventing information leakage and unauthorized usage of a USB-LAN adapter. In this respect, there has been proposed, for example, in Japanese Patent Laid-Open No. 2010-049333 a control method of maintaining or disconnecting network connection on the electrical or software basis according to the statuses of usage of USB devices in a case where the number of USB devices connected exceeds this upper limit.

An information processing apparatus having printing functions such as an MFP (Multi Function Peripheral) is required to be always in a communicable state in order to receive a print request from a nearby client PC. Therefore, control on maintaining or disconnecting network connection according to the communication status via USB-LAN adapters is not appropriate for such an information processing apparatus. Further, even in a case where a user selects the communication mode that uses a USB-LAN adapter, network connection cannot be established unless the USB-LAN adapter is connected, but such a problem is not taken into consideration in the above-mentioned Japanese Patent Laid-Open No. 2010-049333. Furthermore, in a case where the information processing apparatus is activated with the number of USB-LAN adapters connected exceeding an allowable upper limit, communication may be established with a USB-LAN adapter which differs from one intended, which may lead to unfavorable events such as information leakage and unauthorized usage of a USB-LAN adapter. Such a risk on information security is not considered in the above-mentioned Japanese Patent Laid-Open No. 2010-049333 either.

SUMMARY OF THE INVENTION

An information processing apparatus according to the present disclosure is an information processing apparatus having a plurality of external USB ports to which USB compatible network adapters are connected, the information processing apparatus comprising: one or more processors; and one or more memories configured to store instructions executable by the one or more processors to cause the information processing apparatus to perform at least a predetermined notification in response to a number of the network adapters connected to the information processing apparatus via the external USB ports having reached a predetermined upper limit.

Further features of the present invention will become apparent from the following description of exemplary embodiments with reference to the attached drawings.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment (System Configuration)

Figure 1:
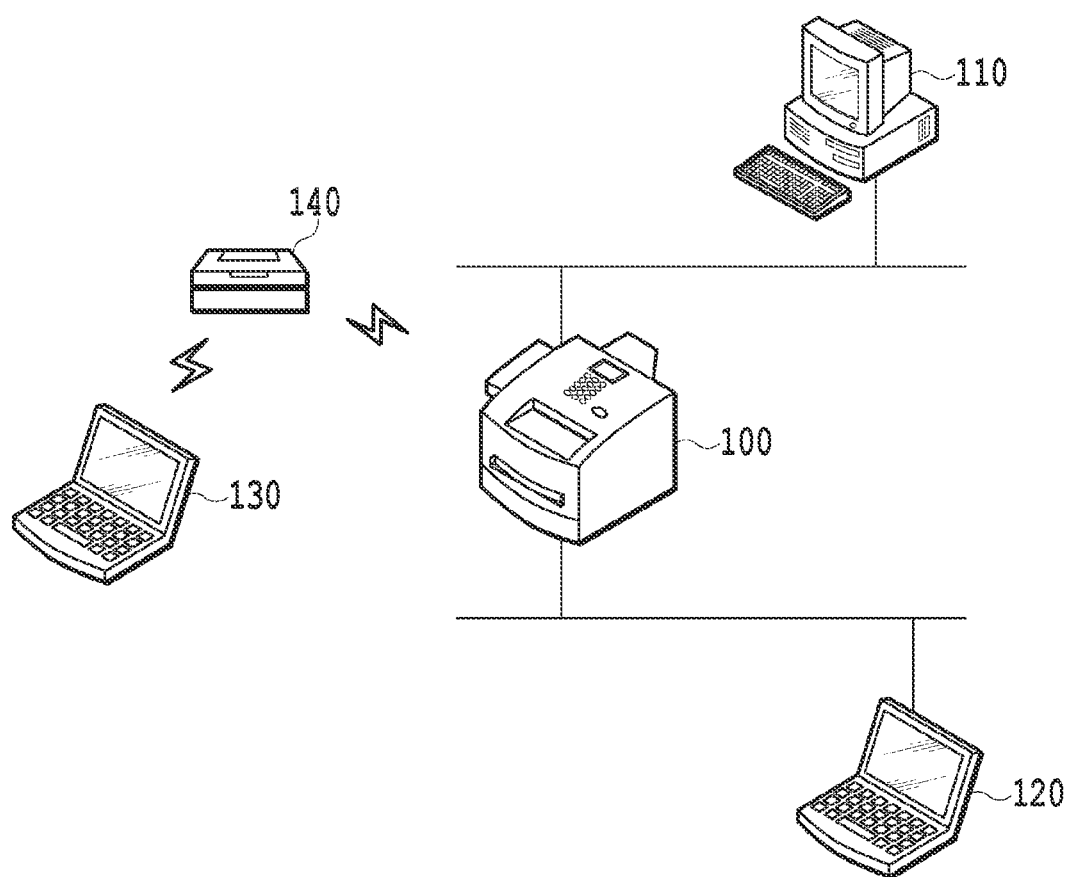
FIG. 1 is a diagram showing one example of the configuration of an information processing system.

FIG. 1 is a diagram showing one example of the configuration of an information processing system according to the present embodiment. The information processing system according to the present embodiment is configured to include a single MFP 100, and three client PCs 110 to 130. The MFP 100 is an information processing apparatus having a plurality of functions such as printing, copying and FAX. The MFP 100 can display, on a display unit provided on the upper part of the casing of the MFP 100, information on network connection, such as an IP address, and the history of print jobs. The MFP 100 and the client PC 110/120 are connected together over a wired LAN so that the client PC 110/120 transmits a print job to the MFP 100 over the wired LAN. The MFP 100 and the client PC 130 are connected together over a wireless LAN so that the client PC 130 transmits a print job to the MFP 100 via an access point 140 (or directly without going through the access point 140).

(Hardware Configuration)

Figure 2:
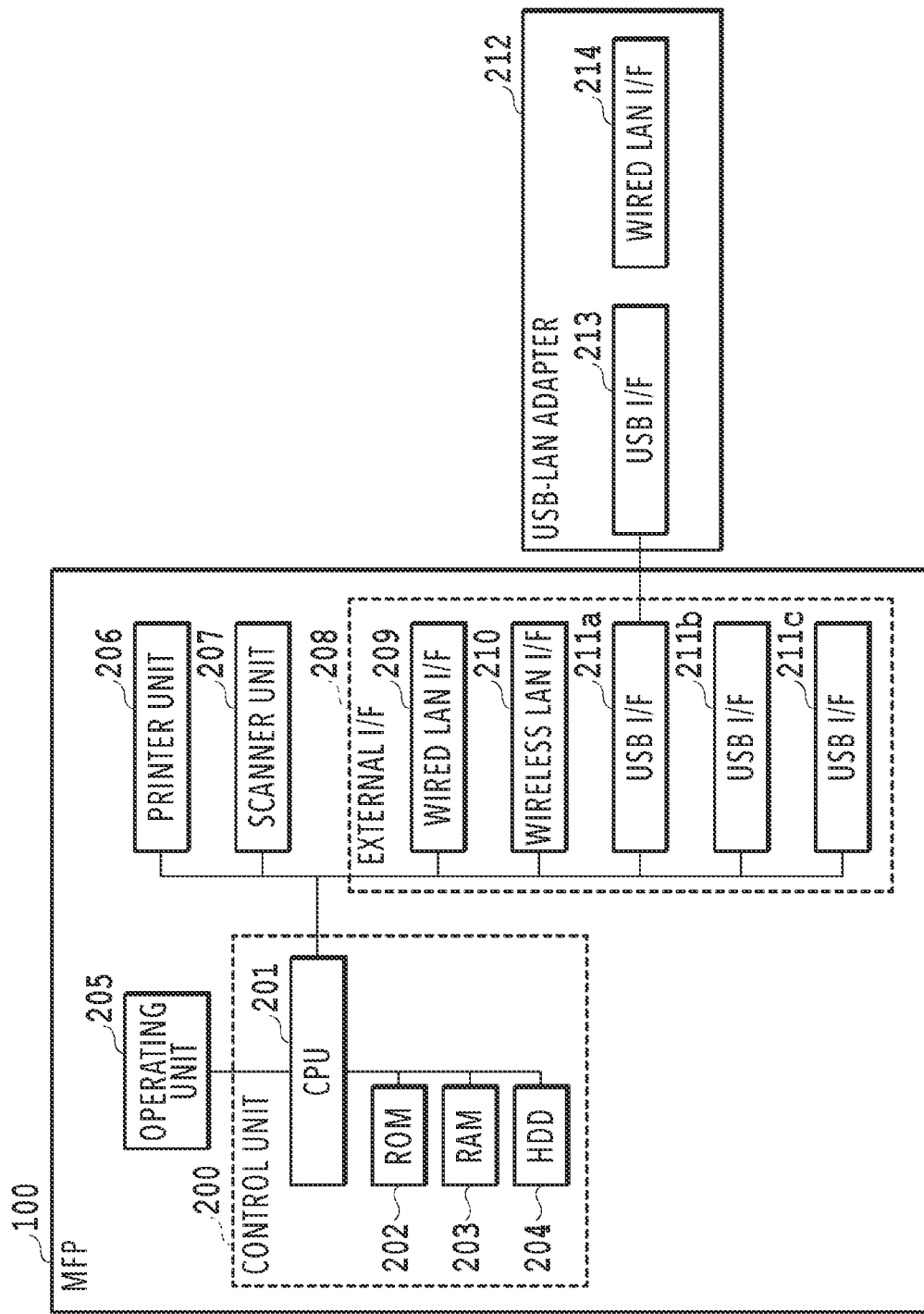
FIG. 2 is a block diagram showing one example of the hardware configuration of an MFP.

FIG. 2 is a block diagram showing one example of the hardware configuration of the MFP 100 according to the present embodiment. The MFP 100 is configured to include a control unit 200, an operating unit 205, a printer unit 206, a scanner unit 207 and an external I/F 208. The control unit 200 is configured to include a CPU 201, a ROM 202, a RAM 203 and an HDD 204, and control the individual internal components of the MFP 100. The CPU 201 reads out a control program stored in the ROM 202 to perform various controls such as communication control. The RAM 203 is used as the main memory of the CPU 201 and a temporary area like a work area. The HDD 204 is a mass storage to store data and various programs, or various information tables. Although the MFP 100 is configured in this embodiment in such a manner that one CPU 201 performs various processes illustrated in various flowcharts to be described later, by using one memory (RAM 203), the MFP 100 is not limited to such a type. For example, a plurality of CPUs and a plurality of memories can be made to cooperate with one another to perform each processing. The operating unit 205 is a user interface for allowing a user who uses the MFP 100 to perform various input operations, and uses a touch panel system and also has the functions of a display unit in the present embodiment. The printer unit 206 performs processing to form and output an image on a sheet of paper or the like according to a print job received from each of the client PCs 110 to 130. The scanner unit 207 performs processing to optically scan a document set on a platen glass (not shown) and output the scanned image as image data. The external I/F 208 includes a wired LAN interface (hereinafter written as "wired LAN I/F") 209 and a wireless LAN interface (hereinafter written as "wireless LAN I/F") 210 as communication means. The external I/F 208 further includes three USB interfaces (hereinafter each written as "USB I/F") 211a to 211c as USB host interfaces. The three USB I/Fs 211a to 211c may be occasionally referred to simply as "USB I/F 211" herein in a case of, for example, describing contents common to the three USB I/Fs 211a to 211c. The wired LAN I/F 209 is a network connection unit for connecting to a wired LAN typified by Ethernet (registered trademark), and is a communication interface that transmits and receives various kinds of data to and from client PCs on the same network. USB ports for external connection to allow peripheral device compatible with the USB standards (hereinafter referred to as "USB device") and USB cables to connect to, and disconnect from, the USB I/Fs 211a to 211c and insertion openings (external ports) to/from which wired LAN cables are connectable/disconnectable are provided on the back side of the casing of the MFP 100. Note that USB connectors may be provided on the front side of the casing. The wireless LAN I/F 210 is a network connection unit for connecting to a wireless LAN such as Wi-Fi, and is a communication interface that transmits and receives various kinds of data to and from client PCs on the same network via the access point 140 (or directly). The USB I/F 211 is a serial interface to connect a USB device to the MFP 100. The USB devices include a keyboard, a mouse, an external HDD as well as a USB compatible network card (hereinafter written as "USB-LAN adapter"). In FIG. 2, the USB-LAN adapter 212 is connected to the USB I/F 211a.

In the present embodiment, USB-LAN connection to be described later shall be managed based on the number of the network adapters connected to the USB ports for external connection of the MFP 100. Therefore, even in a case where the control unit 200 and a network interface, such as the wireless LAN I/F 210 or the wired LAN I/F 209, which the MFP 100 has as standard equipment or optional equipment, are connected together internally or using a USB interface, the standard or optional network interface connected shall be excluded herein from management targets of USB-LAN connection.

The USB-LAN adapter 212 is configured to include a USB I/F 213 for connecting to a USB I/F 211 as a USB host interface, and a wired LAN I/F 214. The USB I/F 211 on the body side of the MFP 100 can be used as a network connection unit similar to the wired LAN I/F 209 by connecting the USB-LAN adapter 212 to the MFP 100. Note that the upper limit of available USB-LAN adapters (hereinafter referred to as the "allowable number of connections") is N, and the maximum value of N is determined by the number of USB I/Fs 211 installed in the MFP 100. The following are some of the reasons why the number of connections of USB host interfaces provided in the device is not set equal to the allowable number of connections.

- To secure some USB host interfaces for use with other USB devices such as a USB memory and an external HDD.
- To manage the risk of information leakage through network connection using a USB-LAN adapter.

Although the MFP 100 includes three USB I/Fs 211 as shown in FIG. 2, it is assumed in the present embodiment that the allowable number of connections of the USB-LAN adapters 212 is set to one.

(Software Configuration)

Figure 3:
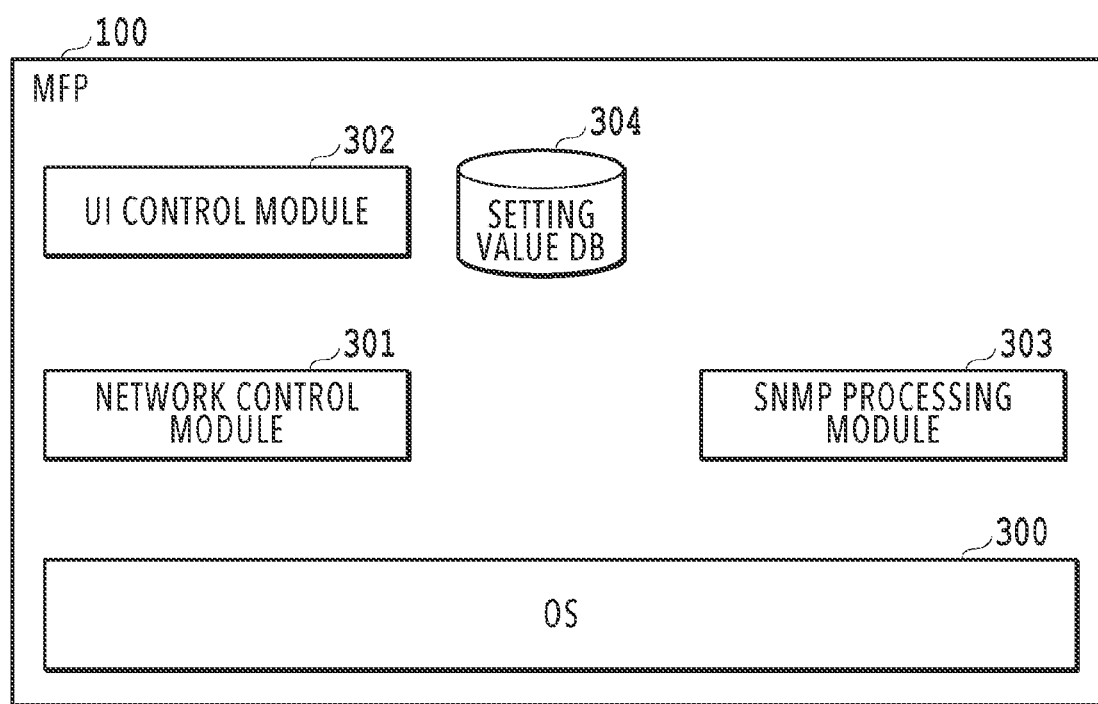
FIG. 3 is a block diagram showing one example of a software configuration related to communication processing in an MFP.

FIG. 3 is a block diagram showing one example of a software configuration related to communication processing in the MFP 100. FIG. 3 shows a network control module 301, a UI control module 302, and an SNMP processing module 303, each module operating on an OS (Operating System) 300. That is, the individual modules are implemented as the CPU 201 reads predetermined programs stored in the ROM 202 into the RAM 203 and executes the programs.

The network control module 301 performs activation control on the wired LAN I/F 209 and the wireless LAN I/F 210, and performs activation control on the USB I/F 211 in a case where the USB I/F 211 serves as a network connection unit. As a result, network connection according to the communication mode selected by the user is established. In a case where connection of the USB-LAN adapter 212 to the USB I/F 211 is detected, for example, the network control module 301 assigns a new network index number to this USB-LAN adapter 212, and establishes the network connection to set a data communicable state. In this case, the network control module 301 further sets a network driver corresponding to the connected USB-LAN adapter 212 and performs a notification according to the status of the network connection to the UI control module 302.

The UI control module 302 receives an instruction to display or input a UI screen for the user of the MFP 100 to make various configurations, and performs an error notification or the like. A setting value DB 304 stores and manages various setting values that are used by individual modules (including, for example, a software module that performs operational control on the printer unit 206 and the scanner unit 207 (not shown in FIG. 3)) which operate within the MFP 100. The various setting values include a setting value indicating whether network connection using the USB-LAN adapter 212 is permitted. With this setting value being set to a value representing prohibition of network connection, even in a case where the user connects the USB-LAN adapter 212 to the USB I/F 211, the USB I/F 211 cannot be used as a network connection unit. For example, the manager or the like of the MFP 100 can prohibit the MFP 100 from being set to a communicable state using the USB-LAN adapter 212 against the intention of the manager or the like by restraining general users from accessing this setting value.

The SNMP processing module 303 notifies status information of the MFP 100 to an external monitoring device according to the SNMP (Simple Network Management Protocol). The SNMP processing module 303 refers to management information called IF-MIB (Management Information Base) and performs a notification of the network status or the like.

(Setting of Communication Mode and Permission of Use of USB-LAN)

Figure 4A:
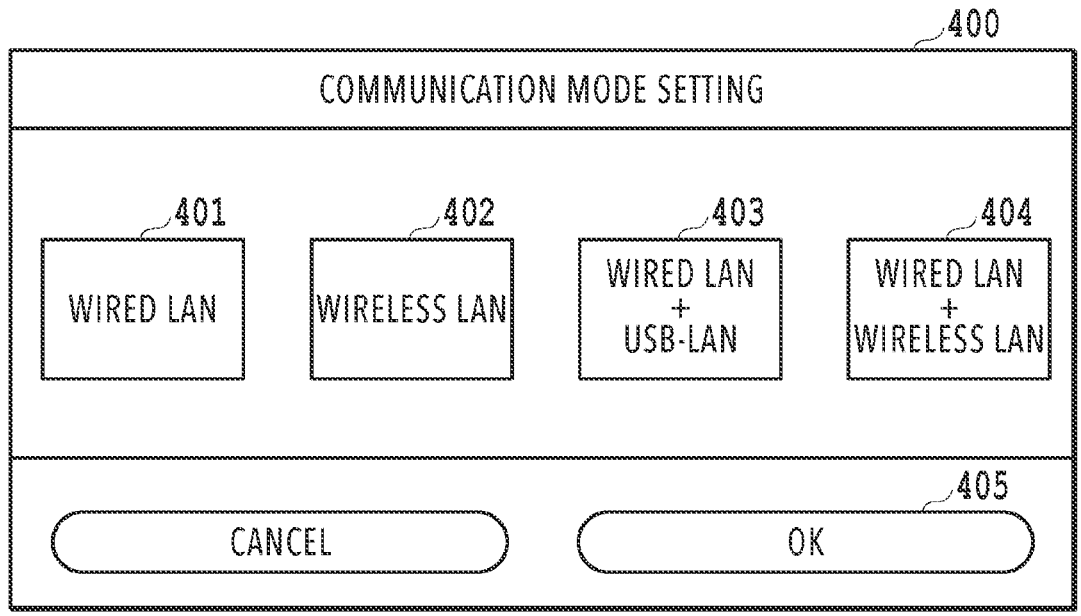
FIG. 4A is a diagram showing one example of a Communication Mode Setting screen.

FIG. 4A shows one example of a UI screen (Communication Mode Setting screen) for a user to set a desired communication mode of the MFP 100. A Communication Mode Setting screen 400 in FIG. 4A includes a "Wired LAN" button 401, a "Wireless LAN" button 402, a "Wired LAN+USB-LAN" button 403, and a "Wired LAN+Wireless LAN" button 404. In a case where the user selects a desired button from among those buttons and depresses an "OK" button 405, network connection according to the communication mode corresponding to the selected button is established by the above-mentioned network control module 301. In a case where the "Wired LAN" button 401 is selected, for example, the wired LAN I/F 209 is activated to establish wired-LAN based network connection (hereinafter written as "wired LAN network"). In a case where the "Wireless LAN" button 402 is selected, the wireless LAN I/F 210 is activated to establish wireless-LAN based network connection (hereinafter written as "wireless LAN network"). In a case where the "Wired LAN+USB-LAN" button 403 is selected, the wired LAN I/F 209 and the wired LAN I/F 214 in the USB-LAN adapter 212 are activated to establish wired-LAN based network connection via USB (hereinafter written as "usb LAN network"). In a case where the "Wired LAN+Wireless LAN" button 404 is selected, the wired LAN I/F 209 and the wireless LAN I/F 210 are both activated to establish both of wired LAN network and wireless LAN network. It is to be noted that "activation of a LAN interface" is used herein to mean establishment of LAN based network connection by, for example, obtaining an IP address.

Figure 4B:
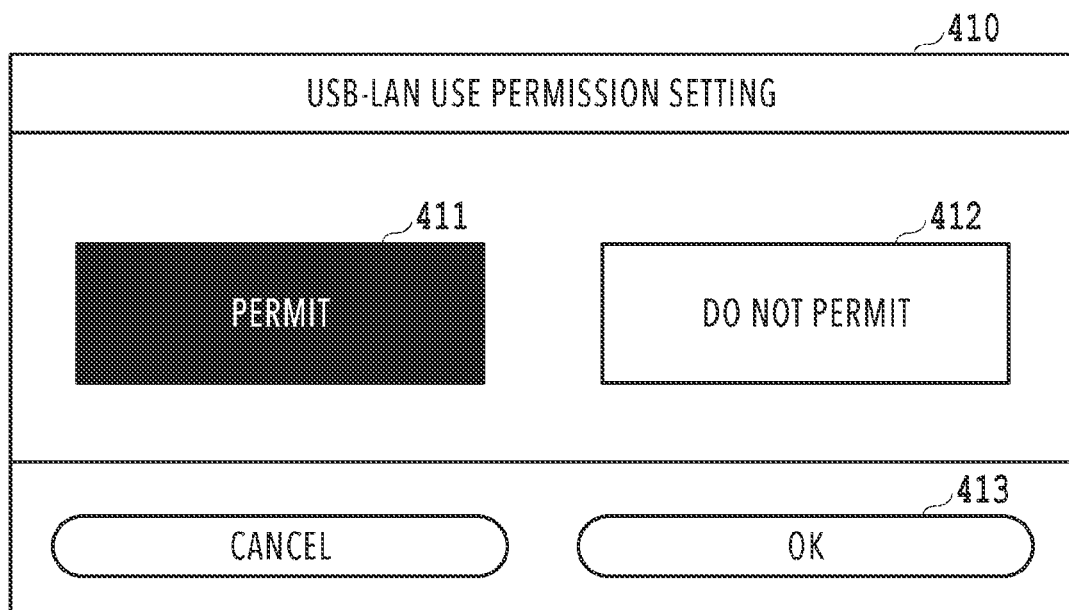
FIG. 4B is a diagram showing one example of a USB-LAN Use Permission Setting screen.

FIG. 4B shows one example of a UI screen (USB-LAN Use Permission Setting screen) for a manager or the like to set permission of the use of the USB-LAN adapter 212. A USB-LAN Use Permission Setting screen 410 in FIG. 4B includes a "Permit" button 411 and a "Do Not Permit" button 412. In a case where the user selects the "Permit" button 411 and depresses an "OK" button 413, a state in which network connection can be established (network-connection permitted state) by using the USB-LAN adapter 212 is set. Specifically, a value representing the permitted state is set to the setting value that is related to the use of the USB-LAN adapter 212 in the above-mentioned setting value DB 304. In a case where in this network-connection permitted state, the user selects the communication mode of "Wired LAN+USB-LAN" and then connects the USB-LAN adapter 212 to the USB I/F 211, the MFP 100 establishes a usb LAN network using the USB-LAN adapter 212. In a network-connection unpermitted state, on the other hand, even in a case where connection of the USB-LAN adapter 212 to the USB I/F 211 is detected, the MFP 100 does not establish a usb LAN network. Although FIG. 4B shows a UI screen for setting only permission/non-permission of the use of a USB-LAN adapter, the UI screen is not limited to this type. For example, the UI screen may be designed to set permission/non-permission of other USB devices such as a USB memory and a USB keyboard in addition to permission/non-permission of the use of a USB-LAN adapter.

(Network Connection Control Flow in MFP)

Figure 5:
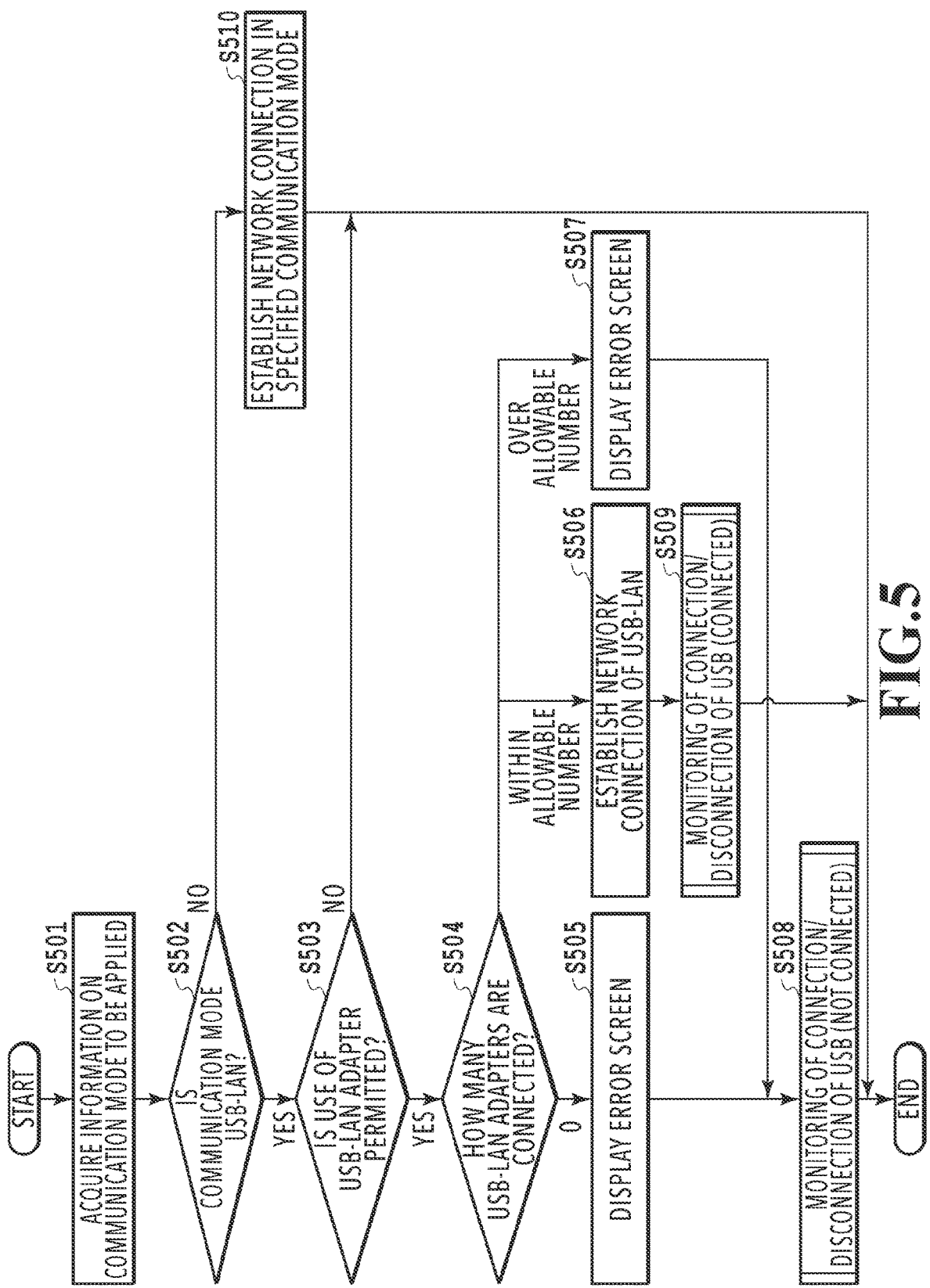
FIG. 5 is a flowchart illustrating the flow of control on network connection according to a first embodiment.

Next, control processing related to network connection which is performed by the network control module 301 of the MFP 100 will be described. FIG. 5 is a flowchart illustrating the flow of control on network connection according to the present embodiment. This flow is carried out in a case where an operation of powering the MFP 100 on is performed. The letter "S" at the top of the numeral of each block of processing refers to "step."

At S501, information on a communication mode to be applied is acquired. In a case where an operation of powering the MFP 100 off is performed, information on the communication mode that is selected at that point of time is stored in the HDD 204. In a case where the MFP 100 is powered on next, this stored information will be read out at this step. In a case where the MFP 100 is powered on for the first time, information on the communication mode at an immediately previous time at which the MFP 100 was powered off is not stored, so that the Communication Mode Setting screen may be displayed, for example, to allow the user to select the communication mode.

At S502, separation of the processing is performed according to the contents of the communication mode to be applied, which are acquired at S501. Specifically, the processing advances to S503 in a case where the communication mode to be applied is "USB-LAN," and advances to S510 in case of other communication modes.

At S503, it is determined whether the use of the USB-LAN adapter 212 is permitted by referring to the setting value DB 304. The processing advances to S504 in a case where a value indicating the aforementioned "network-connection permitted state" is set in the setting value DB 304, and the processing leaves this flow in a case where a value indicating the "network-connection unpermitted state" is set in the setting value DB 304. At this time, processing such as displaying a message indicating that the network connection using the USB-LAN adapter is "not permitted" on the operating unit 205 may also be performed.

At S504, separation of the processing is performed according to the number of the USB-LAN adapters 212 connected to the USB I/Fs 211. Specifically, information on the number of the USB-LAN adapters connected is referred to, and the processing advances to S505 in a case where the number is zero, the processing advances to S506 in a case where the number lies within the allowable number of connections, and the processing advances to S507 in a case where the number exceeds the allowable number of connections. The allowable number of connections herein is one or greater and less than the preset upper limit. According to the present embodiment, as described above, the allowable number of USB-LAN adapters is one, so that in a case where two or more USB-LAN adapters are connected, the processing advances to S507. It is to be noted that the information on the number of connections is information acquired as needed by different processing from the present flow and stored in the RAM 203. In a case where connection of the USB-LAN adapter is confirmed through detection or the like of a change in the voltage at a predetermined terminal within the USB connector, the then number of connections is stored in the RAM 203.

Figure 6A:
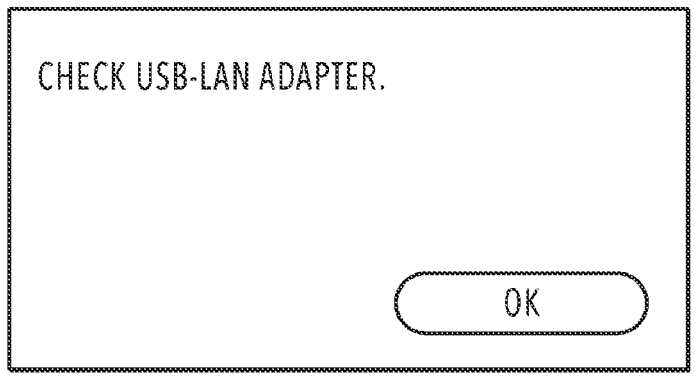
FIGS. 6A to 6C are diagrams each showing one example of an error screen.
Figure 6B:
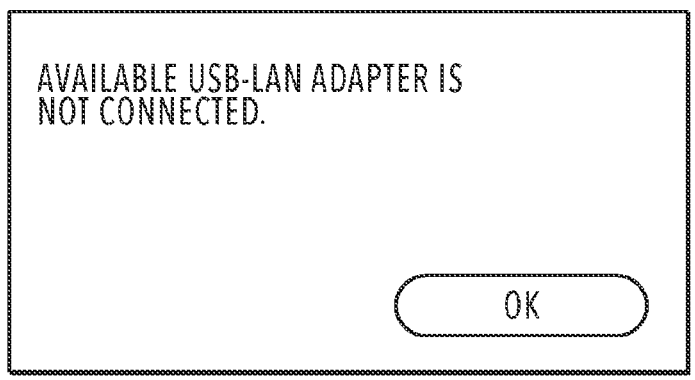

At S505 in a case where the USB-LAN adapters 212 are not connected (the number of connections: 0), an error screen which notifies a user of an abnormality in the connection configuration of the USB-LAN adapter 212 and prompts the user to check the connection status is displayed on the operating unit 205. FIGS. 6A and 6B show one example of an error screen at the time of the display. A message prompting general confirmation of the overall connections of the USB-LAN adapters 212 is displayed on the error screen of FIG. 6A. A direct message informing that the USB-LAN adapters 212 are not connected is displayed on the error screen of FIG. 6B. Either of the error screens may be displayed. After the displaying of the error screen, the processing advances to S508.

At S506 in a case where the number of the USB-LAN adapters 212 connected lies within the allowable number of connections (one in this embodiment), the wired LAN I/F 209 and the wired LAN I/F 214 in the USB-LAN adapter 212 are activated to establish the usb LAN network. After the establishment of the usb LAN network, the processing advances to S509.

Figure 6C:
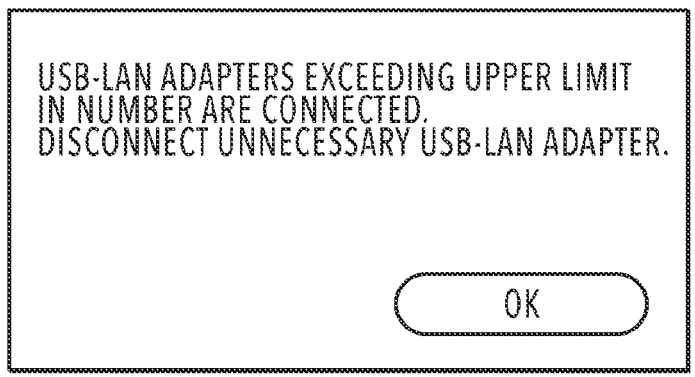

At S507 in a case where the number of the USB-LAN adapters 212 connected exceeds the allowable number of connections, an error screen which notifies the user of an abnormality in the connection configuration of the USB-LAN adapters 212 and prompts the user to check the connection status is also displayed on the operating unit 205. At this time, the error screen shown in FIG. 6A may be displayed, or an error screen as shown in FIG. 6C showing a more direct message indicating that the number of the USB-LAN adapters 212 connected exceeds the upper limit may be displayed. After the error screen is displayed, the processing advances to S508. The control up to S507 is control in the MFP 100 at the time of activation thereof, and the subsequent S508 and S509 are control after activation.

At S508, monitoring of connection/disconnection of the USB-LAN adapter 212 at a time the usb LAN network is not established is performed. At S509, monitoring of connection/disconnection of the USB-LAN adapter 212 during establishment of the usb LAN network is performed. First, a description will be given of monitoring of connection/disconnection of the USB-LAN adapter 212 at the time the usb LAN network is not established according to the flowchart of FIG. 7A.

Figure 6D:
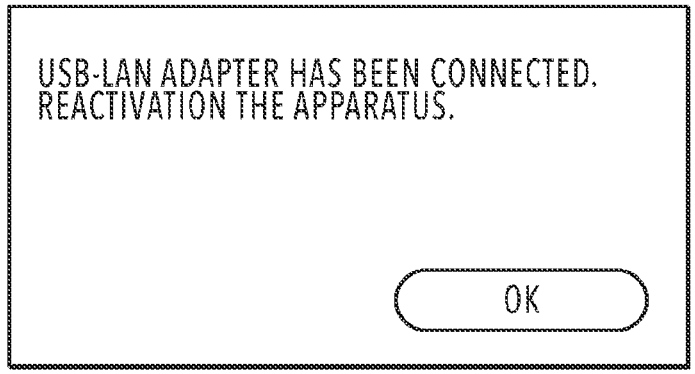
FIG. 6D is a diagram showing one example of a notification screen which prompts reactivation.

At S701, detection of connection/disconnection of the USB-LAN adapter 212 is repeated at predetermined intervals. In a case where the connection/disconnection of the USB-LAN adapter 212 is detected, separation of the processing is performed at S702 according to the current number of connections. This step corresponds to the above-described S504. In a case where the result of detection of the connection/disconnection of the USB-LAN adapter 212 indicates that the number of connections is zero, the processing advances to S703, and in a case where the number of connections lies within the allowable number of connections, the processing advances to S704, and in a case where the number of connections exceeds the allowable number of connections, the processing advances to S705. At step S703, as done at the above-described S505, the error screen shown in FIG. 6A or FIG. 6B which notifies the user of an abnormality in the connection configuration of the USB-LAN adapter 212 and prompts the user to check the connection status is displayed on the operating unit 205. After the error screen is displayed, the processing leaves this flow. At S704, for example, a notification screen as shown in FIG. 6D prompting the user to reactivation the MFP 100 is displayed on the operating unit 205. In response to the depression of the "OK" button on the notification screen of FIG. 6D, the reactivation of the MFP 100 may be performed immediately, or the processing may await a reactivation instruction by the user. After the notification screen is displayed, the processing leaves this flow. At S705, as done at the above-described S507, the error screen shown in FIG. 6A or FIG. 6C which notifies the user of an abnormality in the connection configuration of the USB-LAN adapter 212 and prompts the user to check the connection status is displayed on the operating unit 205. After the error screen is displayed, the processing leaves this flow.

Figure 7A:
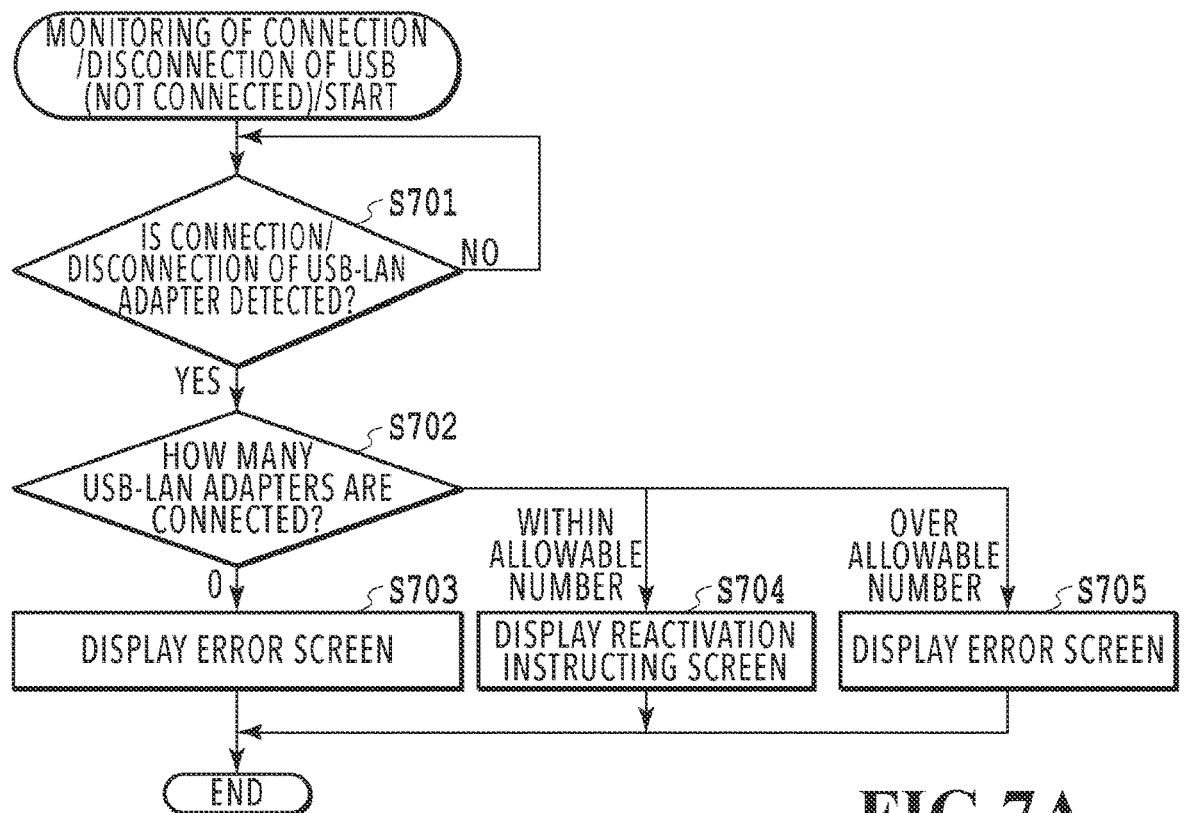
FIG. 7A is a flowchart illustrating the details of processing of monitoring connection/disconnection of a USB-LAN adapter at a time a network is not established.
Figure 7B:
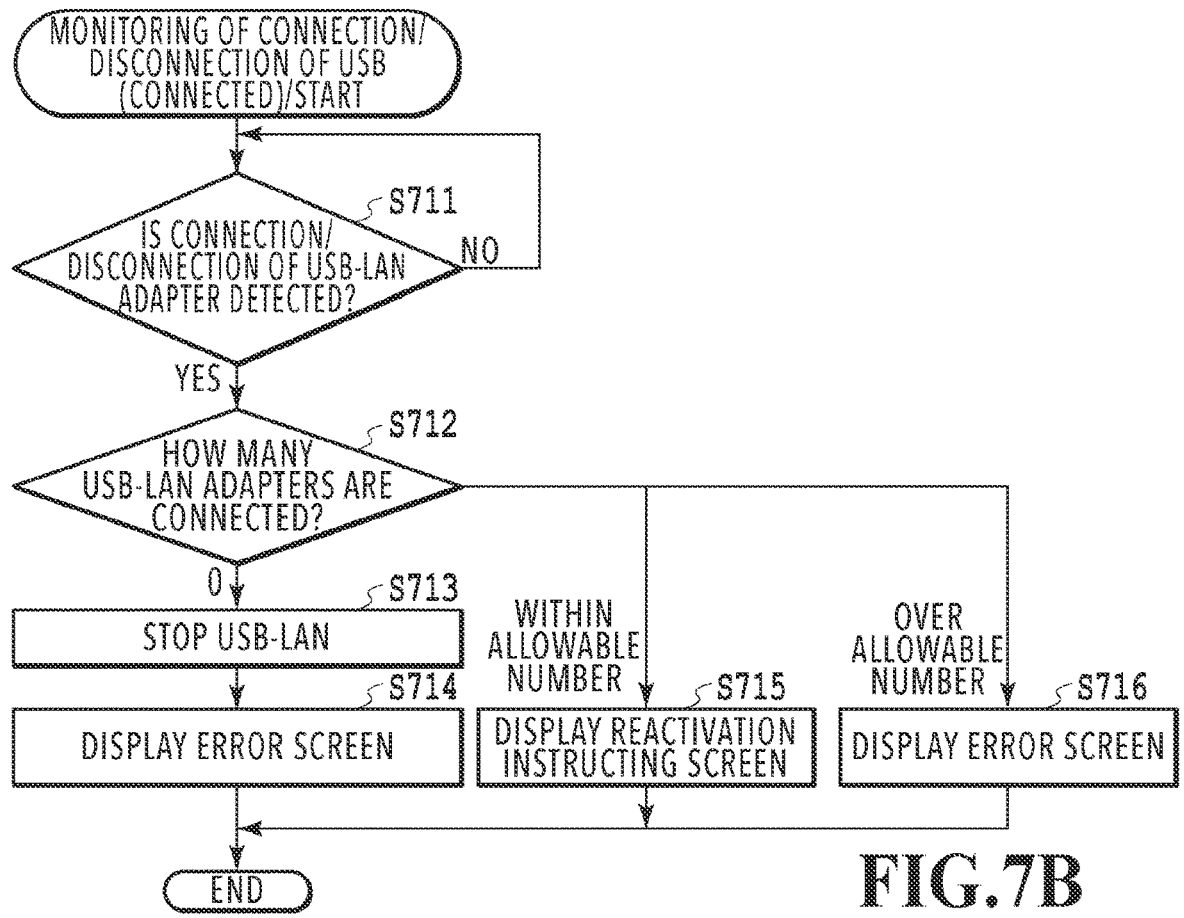
FIG. 7B is a flowchart illustrating the details of processing of monitoring connection/disconnection of a USB-LAN adapter during establishment of a network.

Next, monitoring of the connection/disconnection of the USB-LAN adapter 212 during establishment of the usb LAN network will be described with reference to the flowchart of FIG. 7B. S711 and S712 respectively correspond to S701 and S702 in the flow of FIGS. 7A, and S714, S715, and S716 respectively correspond to S703, 704, and S705 in the flow of FIG. 7A. The difference of the flow of FIG. 7B from the flow of FIG. 7A is the presence of S713. In a case where the number of the USB-LAN adapters 212 connected is zero, the wired LAN I/F 209 and the wired LAN I/F 214 (in the USB-LAN adapter 212) are stopped, and come to an inactive state where transmission/reception or the like of commands is not performed. It is to be noted that, as apparent from the flow of FIG. 7B, even in a case where the number of the USB-LAN adapters 212 connected exceeds the allowable number of connections, the established usb LAN network is maintained (the absence of the step corresponding to S713). That is, although the user is notified by the error screen that the USB-LAN adapters 212 are in an inappropriate state where the number of the USB-LAN adapters 212 connected exceeds the upper limit, a print job or the like can be received continuously since the network connection is still established.

The above is the description of the contents of the monitoring of connection/disconnection of USB in S508 and S509. The description returns to the description of the flow of FIG. 5.

At S510 in a case where the communication mode to be applied is other than "USB-LAN," the LAN interface that corresponds to the communication mode indicated by the communication mode information is activated. That is, the LAN interface of any one of "Wired LAN," "Wireless LAN," and "Wired LAN+Wireless LAN" is activated to establish a predetermined network connection.

The above is the description of the contents of the control processing related to network connection in the MFP 100 according to the present embodiment.

According to this embodiment, the network connection by the USB-LAN adapter is established only in a case where the allowable connection configuration is detected. This can improve the convenience and security in establishing network connection via the USB-LAN adapter.

Second Embodiment

The foregoing section of the first embodiment has described the control on network connection in the case where the allowable number of USB-LAN adapters connected is set to one. Next, control on network connection in a case where the allowable number of USB-LAN adapters connected is set to more than one will be described as a second embodiment. In addition, a description on the contents which are common with the first embodiment will be omitted or simplified, and the following description shall be focused on the differences from the first embodiment.

Figure 8:
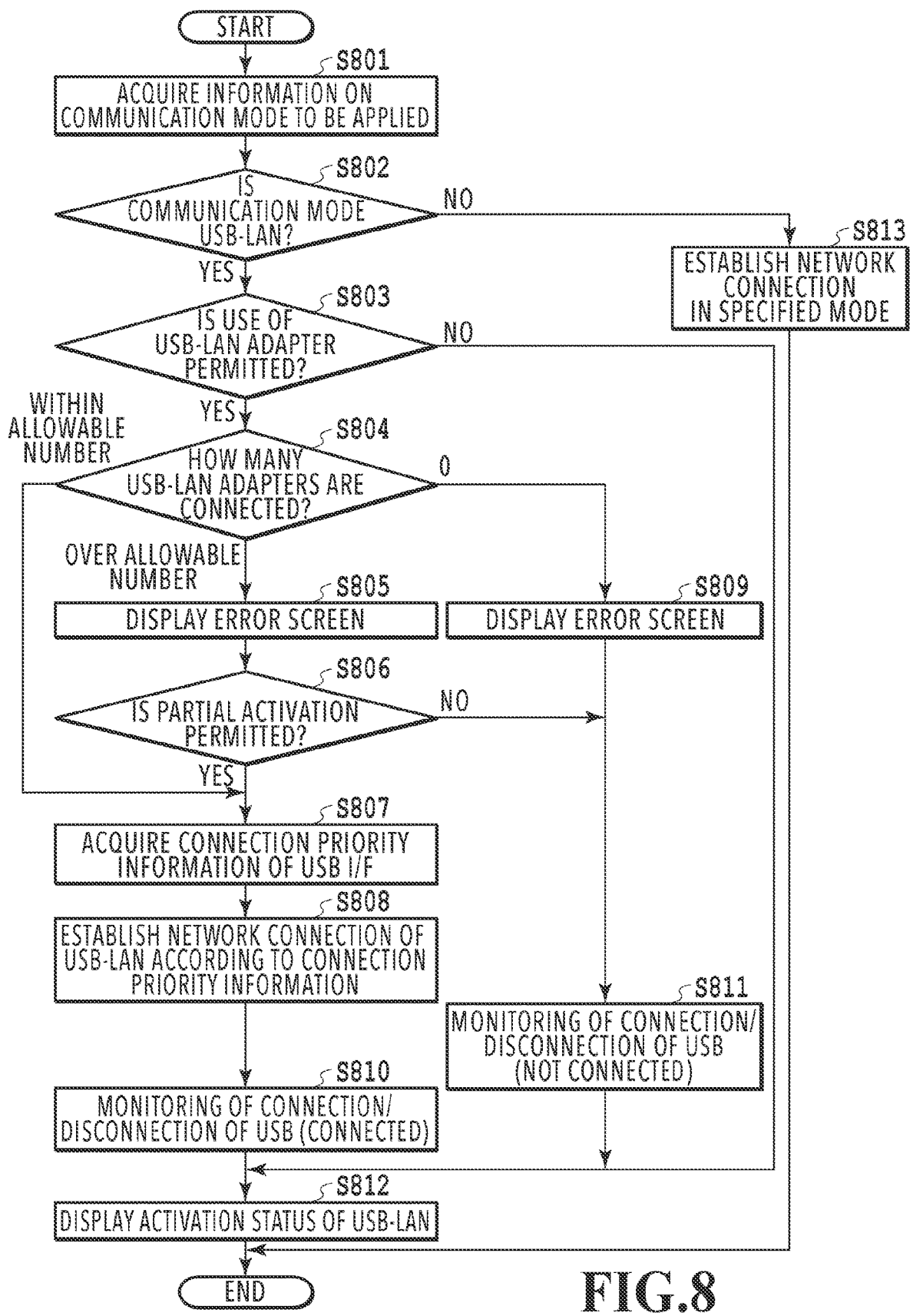
FIG. 8 is a flowchart illustrating the flow of control on network connection according to a second embodiment.

FIG. 8 is a flowchart illustrating the flow of control on network connection according to the present embodiment, which corresponds to the flowchart of FIG. 5 of the first embodiment. S801 to S804 respectively correspond to S501 to S504 in the flow of FIG. 5 described above. That is, the information on the communication mode to be applied is acquired (S801), and the processing advances to S803 in a case where the communication mode is "USB-LAN" (Yes at S802), and the processing advances to S813 in a case where the communication mode is other than "USB-LAN" (No at S802). Then, at S803, in a case where the use of the USB-LAN adapter 212 is set to "Permitted", the processing advances to S804, and in a case where the use of the USB-LAN adapter 212 is set to "Not Permitted," the processing advances to S812. At S804, separation of the processing is performed according to the number of USB-LAN adapters 212 connected to the USB I/Fs 211. That is, the processing advances to S805 in a case where based on the information on the number of the USB-LAN adapters 212 connected, the number of USB-LAN adapters 212 connected exceeds the allowable number of connections, the processing advances to S809 in a case where the number of USB-LAN adapters 212 connected is zero, and the processing advances to S807 in a case where the number of USB-LAN adapters 212 connected lies within the allowable number of connections.

At S805 in the case where the number of the USB-LAN adapters 212 connected exceeds the allowable number of connections, as done at S507 of the flow of FIG. 5, an error screen such as the one shown in FIG. 6A or FIG. 6C which notifies the user of an abnormality in the connection configuration and prompts the user to check the connection status is displayed on the operating unit 205. After displaying the error screen, the processing advances to S806.

At S809 in the case where the USB-LAN adapter 212 is not connected (the number of connections: 0), as done at S505 of the flow of FIG. 5, an error screen such as the one shown in FIG. 6A or FIG. 6B to prompt the user to check the connection of the USB-LAN adapter 212 is displayed on the operating unit 205. After the error screen is displayed, the processing advances to S811.

Figure 9A:
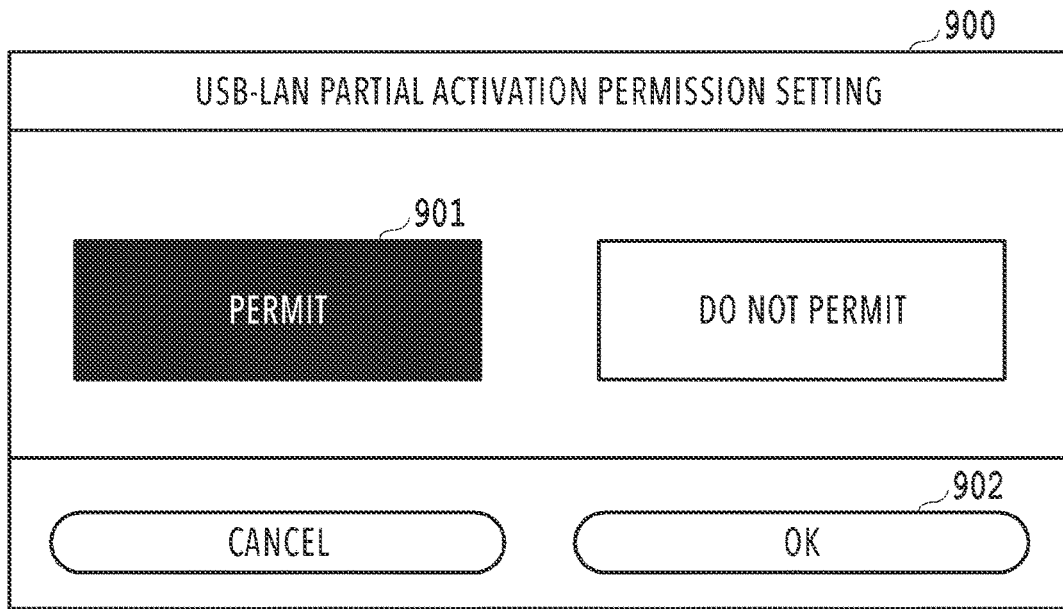
FIG. 9A is a diagram showing one example of a USB-LAN Partial Activation Permission Setting screen.
Figure 9B:
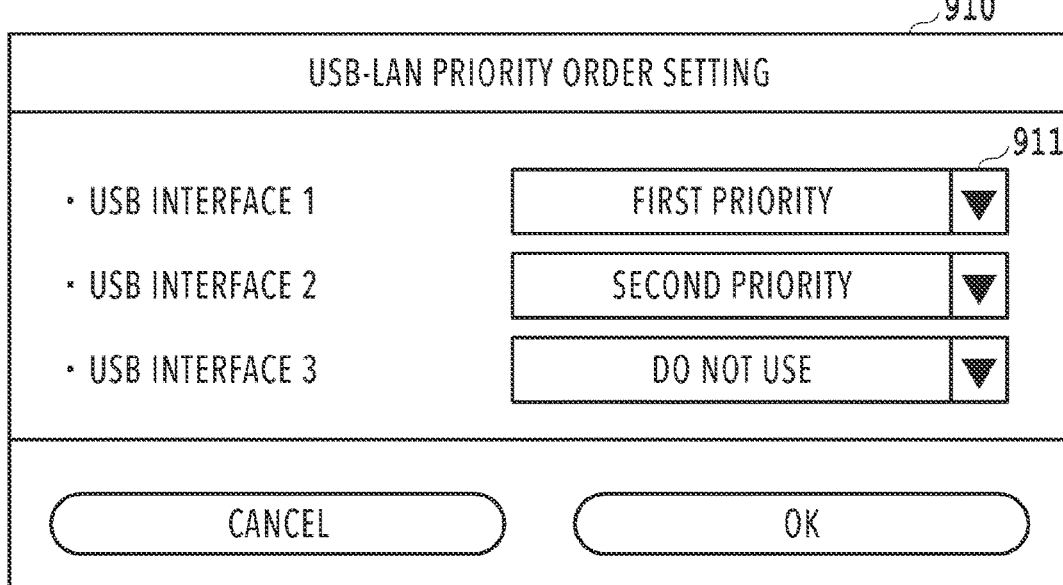
FIG. 9B is a diagram showing one example of a USB-LAN Priority Order Setting screen.
Figure 9C:
FIG. 9C is a priority order list.

At S806, separation of the processing is performed according to whether the setting has been made to permit establishment of a usb LAN network using the USB-LAN adapters 212 in connection within the allowable number of connections. FIG. 9A shows a "USB-LAN Partial Activation Permission Setting" screen 900 for a manager or the like to set permission/non-permission of establishment of a usb LAN network within the range of the allowable number of connections. As an "OK" button 902 is depressed with a "Permit" button 901 selected on the "USB-LAN Partial Activation Permission Setting" screen 900, a "USB-LAN Priority Order Setting" screen 910 shown in FIG. 9B is then displayed. For each of the USB I/Fs 211a to 211c, the manager or the like uses a pull-down menu bar 911 to specify a desired priority order from a priority order list shown in FIG. 9C in consideration of the allowable number of connections. In the example of FIG. 9B, "USB interface 1 (211a)" is specified as "First Priority," "USB interface 2 (211b)" is specified as "Second Priority," and "USB interface 3 (211c)" is specified as "Do Not Use." In other words, in this case, the number of allowable connections is limited to two of the available USB I/Fs 211a to 211c, and the priority order is set for those two. Thus, any USB I/F 211 can also be set as a USB interface that cannot use the USB-LAN adapter 212. In this way, the manager or the like performs in advance setting as to whether to permit establishment of the usb LAN network within the allowable number of connections, and in which priority order the USB I/F 211 is to be used in a case of permitting establishment of the usb LAN network. Then, in this step, in the case where it is understood from such setting information that establishment of the usb LAN network within the allowable number of connections is set to "Permit," the processing advances to S807, and in the case where establishment of the usb LAN network is set to "Do Not Permit," the processing advances to S810.

At S807, the above-described priority order information (connection priority information) related to the network connection using the USB I/F 211 is acquired. At subsequent S808, a usb LAN network is established according to the priority order indicated by the acquired connection priority information. For example, in a case of the contents of the setting of FIG. 9B described above, a usb LAN network using the USB-LAN adapter 212 connected to the "First Priority" USB I/F 211a is first established. Thereafter, a usb LAN network using the USB-LAN adapter 212 connected to the "Second Priority" USB I/F 211b is established. As the establishment of the usb LAN network within the allowable number of connections is completed, the processing advances to S810.

At S810, as done at S509, monitoring of connection/disconnection of the USB-LAN adapter 212 during establishment of a usb LAN network is performed. At S811, as done at S508, monitoring of connection/disconnection of the USB-LAN adapter 212 at the time a usb LAN network is not established is performed. First, monitoring of connection/disconnection of the USB-LAN adapter 212 during establishment of a usb LAN network will be described with reference to the flowchart of FIG. 10.

At S1001, detection of connection/disconnection of the USB-LAN adapter 212 is repeated at predetermined intervals. In a case where such connection/disconnection is detected, it is determined at S1002 whether a connected USB-LAN adapter 212 has been disconnected (whether disconnection for any one of usb LAN networks having established the connection has been made). In a case where disconnection of a network by disconnection of the USB-LAN adapter 212 is detected, the processing advances to S1003, and otherwise (in a case where connection of the USB-LAN adapter 212 is detected), the processing advances to S1004. At S1003, as done at S713 of the flow of FIG. 7B described above, the wired LAN I/F 214 in the USB-LAN adapter 212 whose disconnection from the network has been detected is disabled. At S1004, separation of the processing is performed according to the current number of connections. This step corresponds to the above-described S504. The processing advances to S1005 in a case where the current number of connections exceeds the allowable number of connections, the processing advances to S1007 in a case where the current number of connections lies within the allowable number of connections, and the processing advances to S1008 in a case where the current number of connections is zero. At S1005, the above-described error screen shown in FIG. 6A or FIG. 6C which prompts the user to check the connection of the USB-LAN adapter 212 is displayed on the operating unit 205. After displaying the error screen, the processing advances to S1006 to perform separation of the processing according to whether the setting has been made to permit establishment of a usb LAN network within the allowable number of connections, as done at the above-described S806. The processing advances to S1007 in a case where establishment of a usb LAN network within the allowable number of connections is set to "Permit," and the processing leaves this flow in a case where such establishment of a usb LAN network is set to "Do Not Permit." At S1007, the above-described notification screen as shown in FIG. 6D which prompts the user to reactivation the MFP 100 is displayed on the operating unit 205. At S1008, the above-described error screen as shown in FIG. 6A or FIG. 6B which prompts the user to check the connection of the USB-LAN adapter 212 is displayed on the operating unit 205. After displaying the error screen, the processing leaves this flow.

Figure 10:
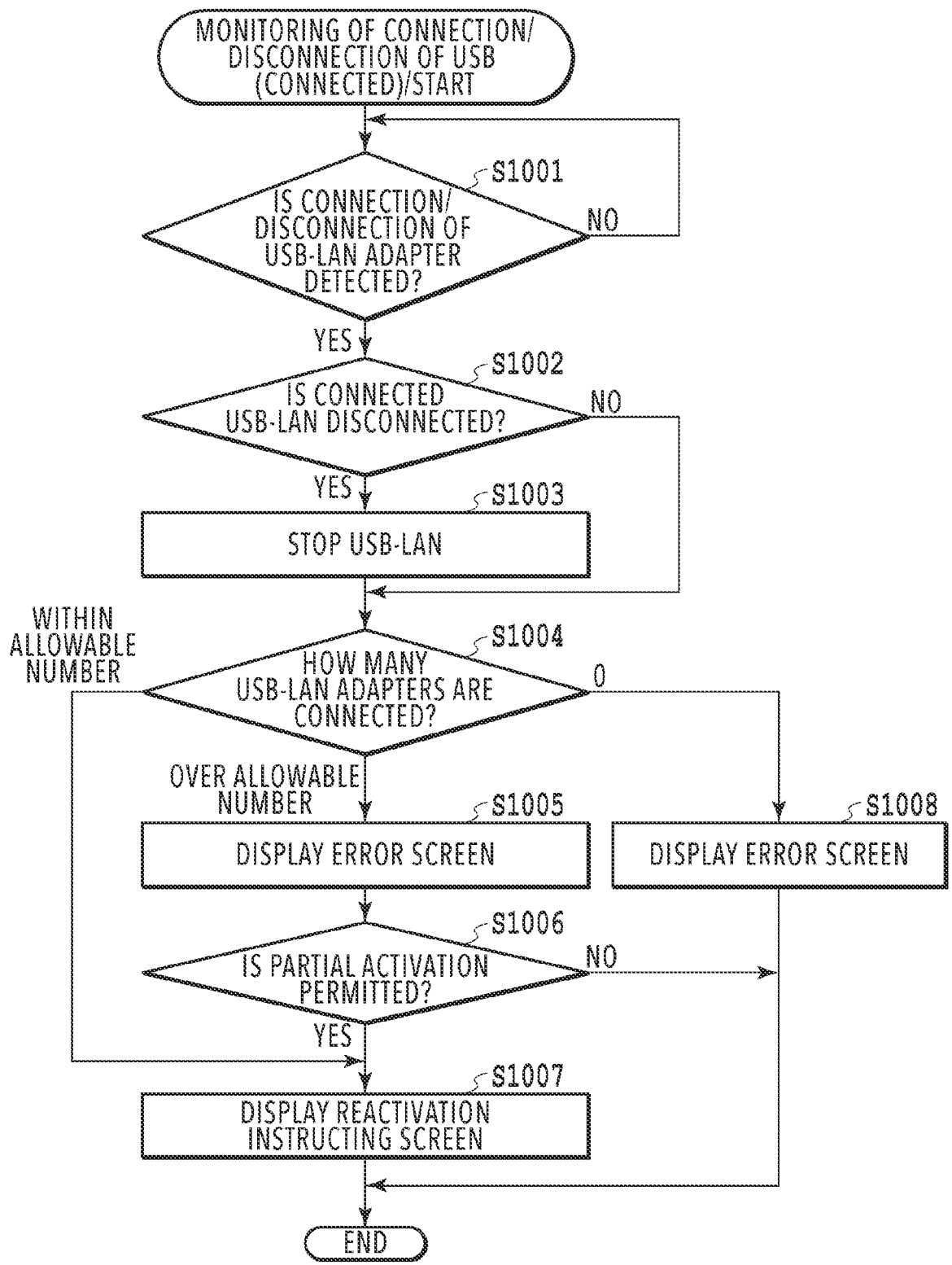
FIG. 10 is a flowchart illustrating the details of processing of monitoring connection/disconnection of a USB-LAN adapter during establishment of a network.
Figure 11:
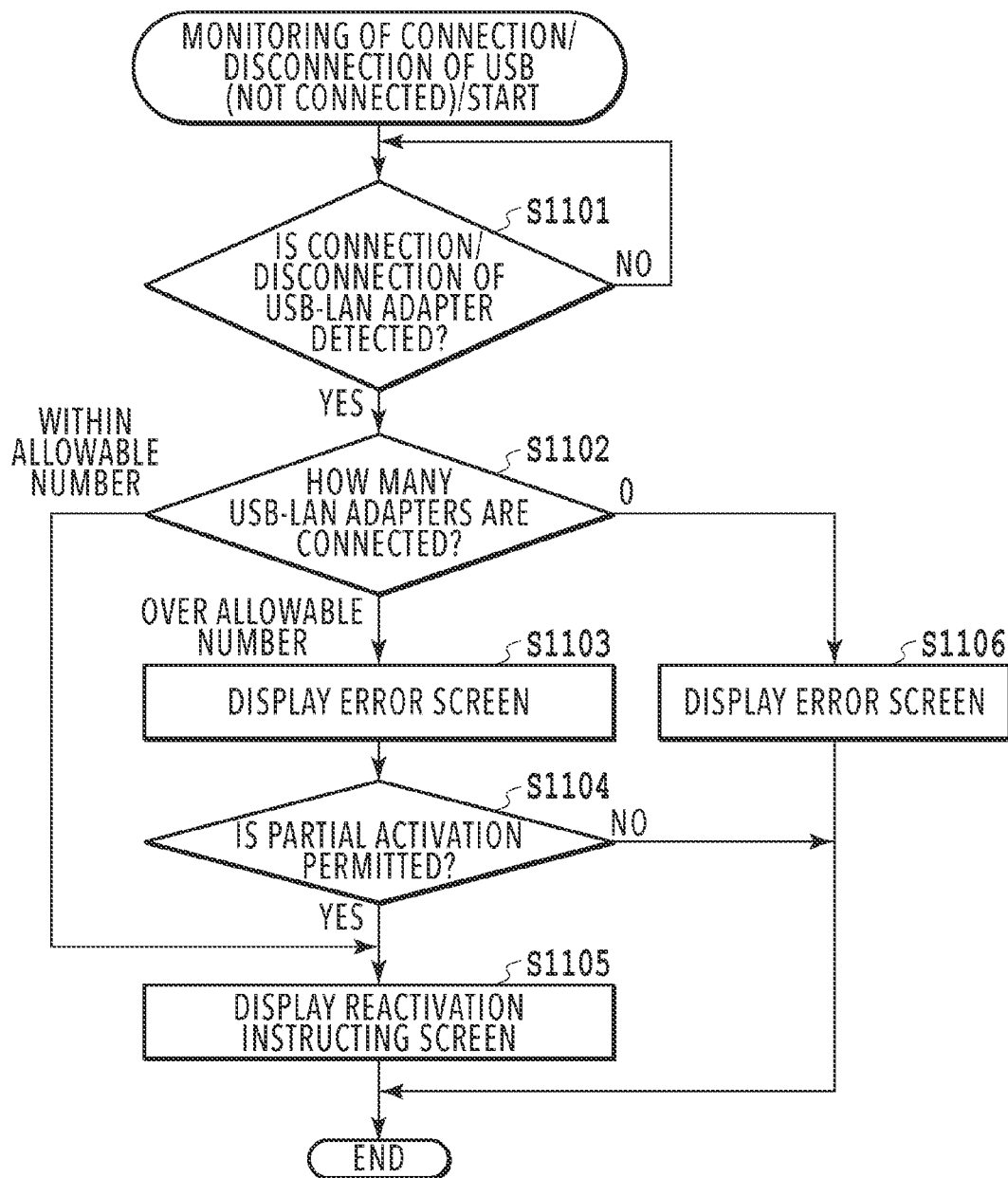
FIG. 11 is a flowchart illustrating the details of processing of monitoring connection/disconnection of a USB-LAN adapter at a time a network is not established.

Next, monitoring of connection/disconnection of the USB-LAN adapter 212 at the time a usb LAN network is not established will be described according to the flowchart of FIG. 11. The difference of the flow of FIG. 11 from the flow of FIG. 10 is the absence of steps corresponding to the above-described S1002 and S1003. That is, S1101 corresponds to S1001 described above, and S1102 to S1105 respectively correspond to S1004 to S1007 described above.

The above has described the contents of monitoring of connection/disconnection of USB at S810 and S811. The description returns to the description of the flow of FIG. 8.

Figure 12:
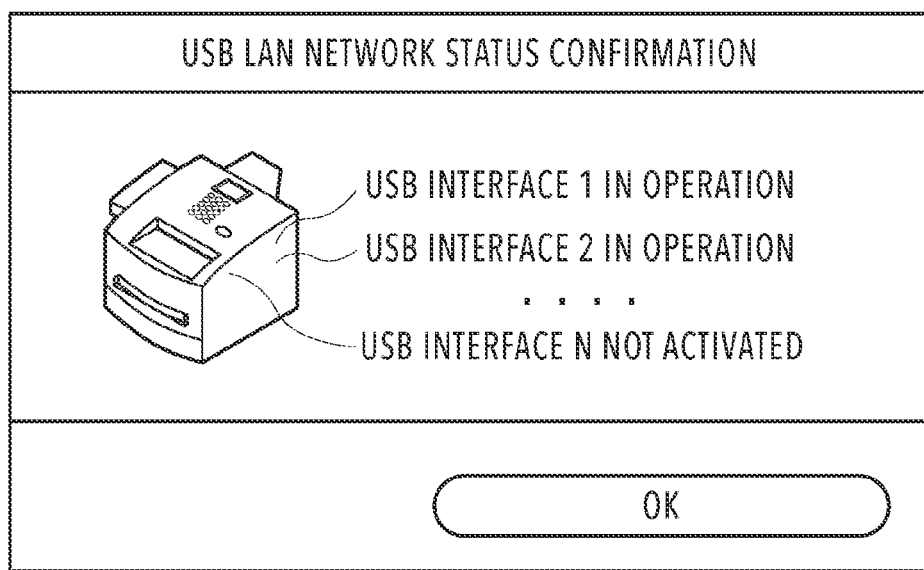
FIG. 12 is a diagram showing one example of a usb LAN Network Status Confirmation screen.

At S812, a UI screen (status confirmation screen) which allows a user to check the status of the usb LAN network using the USB-LAN adapters 212 is displayed on the operating unit 205. FIG. 12 shows one example of a usb LAN network status confirmation screen. FIG. 12 shows an example of the status confirmation screen of a usb LAN network. The user can grasp, through such a UI screen, which USB I/F 211 has been used for establishment of the usb LAN network. The UI screen shown in FIG. 12 is designed so that the respective positions of the USB I/Fs 211a to 211c can also be recognized on the screen. This enables the user to check the status of the usb LAN network using the USB-LAN adapter 212 more quickly and accurately.

The above is the description of the contents of the control processing related to network connection in MFP 100 according to the present embodiment.

According to the present embodiment, even in a case where the number of USB-LAN adapters connected exceeds the allowable number of connections, network connection by using some connected USB-LAN adapters is permitted according to the preset priority order. This further improves the convenience of the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The technology of the present disclosure can improve convenience and security of an information processing apparatus including a USB host interface in a case where network connection is established via a USB-LAN adapter.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-189139, filed Oct. 4, 2018, which is hereby incorporated by reference wherein in its entirety.

What is claimed is:
1. An information processing apparatus having a plurality of external ports which allow network adapters to be connected, the information processing apparatus comprising:
one or more processors; and
one or more memories configured to store instructions executable by the one or more processors to cause the information processing apparatus to:
set an operation mode relating to using the network adapters connected to the external ports in response to a user operation received via a setting screen relating to a network; and
control a notification for a user of information regarding connection statuses of the network adapters, in a case where the network adapters are not connected to the information processing apparatus via the external ports,
wherein in the controlling, the notification is performed in a case where an operation mode of using the network adapters is set as the operation mode, and the notification is not performed in a case where an operation mode of using the network adapters is not set as the operation mode, and wherein the network adapter to be connected is a network adapter for providing a network communication using an Internet Protocol (IP) address.

2. The information processing apparatus according to claim 1, wherein the information processing apparatus is a printing apparatus, the external ports are external Universal Serial Bus(USB) ports, and a plurality of insertion openings of the external USB ports are provided outside a casing of the printing apparatus.

3. The information processing apparatus according to claim 1, wherein the information regarding the connection statuses of the network adapters is to display, on a display unit of the information processing apparatus, information for prompting a user to confirm the connection statuses of the network adapters.

4. The information processing apparatus according to claim 1, wherein the instructions executable by the one or more processors further cause the information processing apparatus to:

control to notify the user of information regarding connection statuses of the network adapters, in a case where a number of the network adapters connected to the information processing apparatus via the external ports exceeds a predetermined upper limit and a device setting of using network adapters connected to the external ports is set.

5. The information processing apparatus according to claim 4, wherein the instructions executable by the one or more processors further cause the information processing apparatus to:

at a time the information processing apparatus is activated, determine whether the number of the network adapters connected to the information processing apparatus via the external ports has exceeded the predetermined upper limit.

6. The information processing apparatus according to claim 1, wherein the instructions executable by the one or more processors further cause the information processing apparatus to:

at a time the information processing apparatus is activated, determine whether the network adapter is connected to the information processing apparatus via the external ports.

7. The information processing apparatus according to claim 6, wherein the instructions executable by the one or more processors further cause the information processing apparatus, after performing the determination at the time of activation of the information processing apparatus, to:

monitor connection/disconnection of the network adapters; and control the notification for the user of the information regarding the connection statuses of the network adapters in a case where the network adapters connected to the external port has been disconnected is detected.

8. The information processing apparatus according to claim 7, wherein the instructions executable by the one or more processors further cause the information processing apparatus, after performing the determination at the time of activation of the information processing apparatus, to:

control the notification for the user of information to prompt the user to restart the information processing apparatus, in a case where the network adapters are connected to the external port is detected and a transition is made from a state in which the network adapters are not connected to the external port to a state in which the network adapters are connected.

9. The information processing apparatus according to claim 1, wherein in a case where the network adapters are not connected to the information processing apparatus via the external ports, and a device setting of using the network adapters connected to the external ports is set, information indicating an available network adapter is not connected is notified as the information regarding the connection statuses of the network adapters.

10. The information processing apparatus according to claim 1, wherein the network adapters are USB compatible network adapters.

11. The information processing apparatus according to claim 1, wherein the network adapters are network adapters having a USB compatible interface and a LAN compatible interface.

12. A control method for an information processing apparatus having a plurality of external ports to which compatible network adapters are connected, the control method comprising:

setting an operation mode relating to using the network adapters connected to the external ports in response to a user operation received via a setting screen relating to a network; and controlling a notification for a user of information regarding connection statuses of the network adapters, in a case where the network adapters are not connected to the information processing apparatus via the external ports, wherein in the controlling, the notification is performed in a case where an operation mode of using the network adapters is set as the operation mode, and the notification is not performed in a case where an operation mode of using the network adapters is not set as the operation mode, and wherein the network adapter to be connected is a network adapter for providing a network communication using an Internet Protocol (IP) address.

13. Non-transitory computer readable storage medium storing a program for causing a computer to perform a control method for an information processing apparatus having a plurality of external ports to which compatible network adapters are connected, the control method comprising:

setting an operation mode relating a using of the network adapters connected to the external ports in response to a user operation received via a setting screen relating to a network; and controlling a notification for a user of information regarding connection statuses of the network adapters, in a case where the network adapters are not connected to the information processing apparatus via the external ports, wherein in the controlling, the notification is performed in a case where an operation mode of using the network adapters is set as the operation mode, and the notification is not performed in a case where an operation mode of using the network adapters is not set as the operation mode, and wherein the network adapter to be connected is a network adapter for providing a network communication using an Internet Protocol (IP) address.

* * * * *